(12) United States Patent
Beck et al.

(10) Patent No.: US 8,506,806 B2
(45) Date of Patent: Aug. 13, 2013

(54) METHODS AND APPARATUS FOR REMOVING SOLIDS FROM A MEMBRANE MODULE

(75) Inventors: Thomas William Beck, New South Wales (AU); Warren Thomas Johnson, New South Wales (AU)

(73) Assignee: Siemens Industry, Inc., Alpharetta, GA (US)

( * ) Notice: Subject to any disclaimer, the term of this patent is extended or adjusted under 35 U.S.C. 154(b) by 134 days.

(21) Appl. No.: 11/575,234

(22) PCT Filed: Sep. 13, 2005

(86) PCT No.: PCT/AU2005/001396
§ 371 (c)(1),
(2), (4) Date: Mar. 14, 2007

(87) PCT Pub. No.: WO2006/029456
PCT Pub. Date: Mar. 23, 2006

(65) Prior Publication Data
US 2008/0053923 A1 Mar. 6, 2008

(30) Foreign Application Priority Data

Sep. 14, 2004 (AU) .................. 2004905292

(51) Int. Cl.
*B01D 63/04* (2006.01)
*B01D 65/08* (2006.01)
*B01D 61/20* (2006.01)
(52) U.S. Cl.
USPC ............ 210/321.69; 210/321.88; 210/321.89; 210/321.9; 210/636; 210/791

(58) Field of Classification Search
None
See application file for complete search history.

(56) References Cited

U.S. PATENT DOCUMENTS

| 256,008 A | 4/1882 | Leak |
| 285,321 A | 9/1883 | Tams |
| 511,995 A | 1/1894 | Buckley |
| 1,997,074 A | 4/1935 | Novotny |
| 2,080,783 A | 5/1937 | Petersen |

(Continued)

FOREIGN PATENT DOCUMENTS

| AU | 34400/84 A | 4/1985 |
| AU | 55847/86 A | 9/1986 |

(Continued)

OTHER PUBLICATIONS

International Search Report dated Nov. 23, 2005 for Application No. PCT/AU2005/001396.

(Continued)

*Primary Examiner* — Krishnan S Menon

(57) ABSTRACT

A method of operating a membrane filtration module (5), the module (5) including one or more membranes (7) extending longitudinally between vertically spaced upper and lower headers (8, 9) into which the ends of the membranes (7) are potted. The membranes (7) have a permeable wall which is subjected to a filtration operation wherein feed containing contaminant matter is applied to one side of the membrane wall and filtrate is withdrawn from the other side of the membrane wall. At least one of the upper and/or lower headers (8, 9) has one or more openings (10) therein and the method including flowing the feed, at least in part, through the one or more openings (10) for application to the membrane wall. Apparatus for performing the method is also disclosed.

4 Claims, 2 Drawing Sheets

(56) References Cited

U.S. PATENT DOCUMENTS

| | | |
|---|---|---|
| 2,105,700 A | 1/1938 | Ramage |
| 2,843,038 A | 7/1958 | Manspeaker |
| 2,926,086 A | 2/1960 | Chenicek et al. |
| 3,068,655 A | 12/1962 | Murray et al. |
| 3,139,401 A | 6/1964 | Hach |
| 3,183,191 A | 5/1965 | Hach |
| 3,191,674 A | 6/1965 | Richardson |
| 3,198,636 A | 8/1965 | Bouthilet |
| 3,228,876 A | 1/1966 | Mahon |
| 3,275,554 A | 9/1966 | Wagenaar |
| 3,442,002 A | 5/1969 | Geary et al. |
| 3,462,362 A | 8/1969 | Kollsman |
| 3,472,168 A | 10/1969 | Inoue et al. |
| 3,472,765 A | 10/1969 | Budd et al. |
| 3,492,698 A | 2/1970 | Geary et al. |
| 3,501,798 A | 3/1970 | Carraro |
| 3,505,215 A | 4/1970 | Bray |
| 3,556,305 A | 1/1971 | Shorr |
| 3,563,860 A | 2/1971 | Henderyckx |
| 3,591,010 A | 7/1971 | Pall et al. |
| 3,625,827 A | 12/1971 | Wildi et al. |
| 3,654,147 A | 4/1972 | Levin |
| 3,679,052 A | 7/1972 | Asper |
| 3,693,406 A | 9/1972 | Tobin, III |
| 3,700,561 A | 10/1972 | Ziffer |
| 3,700,591 A | 10/1972 | Higley |
| 3,708,071 A | 1/1973 | Crowley |
| 3,728,256 A | 4/1973 | Cooper |
| 3,763,055 A | 10/1973 | White et al. |
| 3,791,631 A | 2/1974 | Meyer |
| 3,795,609 A | 3/1974 | Hill et al. |
| 3,804,258 A | 4/1974 | Okuniewski et al. |
| 3,843,809 A | 10/1974 | Luck |
| 3,876,738 A | 4/1975 | Marinaccio et al. |
| 3,955,998 A | 5/1976 | Clampitt et al. |
| 3,968,192 A | 7/1976 | Hoffman, III et al. |
| 3,982,095 A | 9/1976 | Robinson |
| 3,992,301 A | 11/1976 | Shippey et al. |
| 3,993,816 A | 11/1976 | Baudet et al. |
| 4,049,765 A | 9/1977 | Yamazaki |
| 4,076,656 A | 2/1978 | White et al. |
| 4,082,683 A | 4/1978 | Galesloot |
| 4,105,556 A | 8/1978 | O'Amaddio et al. |
| 4,105,731 A | 8/1978 | Yamazaki |
| 4,107,043 A | 8/1978 | McKinney |
| 4,138,460 A | 2/1979 | Tigner |
| 4,157,899 A | 6/1979 | Wheaton |
| 4,183,890 A | 1/1980 | Bollinger |
| 4,188,817 A | 2/1980 | Steigelmann |
| 4,190,411 A | 2/1980 | Fujimoto |
| 4,190,419 A | 2/1980 | Bauer |
| 4,192,750 A | 3/1980 | Elfes et al. |
| 4,193,780 A | 3/1980 | Cotton, Jr. et al. |
| 4,203,848 A | 5/1980 | Grandine, II |
| 4,204,961 A | 5/1980 | Cusato, Jr. |
| 4,218,324 A | 8/1980 | Hartmann et al. |
| 4,226,921 A | 10/1980 | Tsang |
| 4,227,295 A | 10/1980 | Bodnar et al. |
| 4,230,583 A | 10/1980 | Chiolle et al. |
| 4,243,525 A | 1/1981 | Greenberg |
| 4,247,498 A | 1/1981 | Castro |
| 4,248,648 A | 2/1981 | Kopp |
| 4,253,936 A | 3/1981 | Leysen et al. |
| 4,271,026 A | 6/1981 | Chen et al. |
| 4,272,379 A | 6/1981 | Pollock |
| 4,302,336 A | 11/1981 | Kawaguchi et al. |
| 4,315,819 A | 2/1982 | King et al. |
| 4,323,453 A | 4/1982 | Zampini |
| 4,340,479 A | 7/1982 | Pall |
| 4,350,592 A | 9/1982 | Kronsbein |
| 4,353,802 A | 10/1982 | Hara et al. |
| 4,359,359 A | 11/1982 | Gerlach et al. |
| 4,367,139 A | 1/1983 | Graham |
| 4,367,140 A | 1/1983 | Wilson |
| 4,369,605 A | 1/1983 | Opersteny et al. |
| 4,371,427 A | 2/1983 | Holler et al. |
| 4,384,474 A | 5/1983 | Kowalski |
| 4,385,150 A | 5/1983 | Miyake et al. |
| 4,388,189 A | 6/1983 | Kawaguchi et al. |
| 4,389,363 A | 6/1983 | Molthop |
| 4,405,688 A | 9/1983 | Lowery et al. |
| 4,407,975 A | 10/1983 | Yamaguchi |
| 4,414,113 A | 11/1983 | LaTerra |
| 4,414,172 A | 11/1983 | Leason |
| 4,415,452 A | 11/1983 | Heil et al. |
| 4,431,545 A | 2/1984 | Pall et al. |
| 4,451,369 A | 5/1984 | Sekino et al. |
| 4,462,855 A | 7/1984 | Yankowsky et al. |
| 4,467,001 A | 8/1984 | Coplan et al. |
| 4,476,015 A | 10/1984 | Schmitt et al. |
| 4,476,112 A | 10/1984 | Aversano |
| 4,491,522 A | 1/1985 | Ishida et al. |
| 4,496,470 A | 1/1985 | Kapiloff et al. |
| 4,511,471 A | 4/1985 | Muller |
| 4,519,909 A | 5/1985 | Castro |
| 4,539,940 A | 9/1985 | Young |
| 4,540,490 A | 9/1985 | Shibata et al. |
| 4,545,862 A | 10/1985 | Gore et al. |
| 4,547,289 A | 10/1985 | Okano et al. |
| 4,609,465 A | 9/1986 | Miller |
| 4,610,789 A | 9/1986 | Barch |
| 4,614,109 A | 9/1986 | Hofmann |
| 4,623,460 A | 11/1986 | Kuzumoto et al. |
| 4,623,670 A | 11/1986 | Mutoh et al. |
| 4,629,563 A | 12/1986 | Wrasidlo |
| 4,632,745 A | 12/1986 | Giuffrida et al. |
| 4,636,296 A | 1/1987 | Kunz |
| 4,642,182 A | 2/1987 | Drori |
| 4,647,377 A | 3/1987 | Miura |
| 4,650,586 A | 3/1987 | Ellis, III |
| 4,650,596 A | 3/1987 | Schlueter et al. |
| 4,656,865 A | 4/1987 | Callan |
| 4,660,411 A | 4/1987 | Reid |
| 4,666,543 A | 5/1987 | Kawano |
| 4,670,145 A | 6/1987 | Edwards |
| 4,673,507 A | 6/1987 | Brown |
| 4,687,561 A | 8/1987 | Kunz |
| 4,687,578 A | 8/1987 | Stookey |
| 4,688,511 A | 8/1987 | Gerlach et al. |
| 4,689,191 A | 8/1987 | Beck et al. |
| 4,702,830 A | 10/1987 | Makino et al. |
| 4,702,836 A | 10/1987 | Mutoh et al. |
| 4,702,840 A | 10/1987 | Degen et al. |
| 4,707,266 A | 11/1987 | Degen et al. |
| 4,708,799 A | 11/1987 | Gerlach et al. |
| 4,718,270 A | 1/1988 | Storr |
| 4,744,240 A | 5/1988 | Reichelt |
| 4,749,487 A | 6/1988 | Lefebvre |
| 4,756,875 A | 7/1988 | Tajima et al. |
| 4,763,612 A | 8/1988 | Iwanami |
| 4,767,539 A | 8/1988 | Ford |
| 4,769,140 A | 9/1988 | van Dijk et al. |
| 4,774,132 A | 9/1988 | Joffee et al. |
| 4,775,471 A | 10/1988 | Nagai et al. |
| 4,779,448 A | 10/1988 | Gogins |
| 4,781,831 A | 11/1988 | Goldsmith |
| 4,784,771 A | 11/1988 | Wathen et al. |
| 4,793,932 A | 12/1988 | Ford et al. |
| 4,797,187 A | 1/1989 | Davis et al. |
| 4,797,211 A | 1/1989 | Ehrfeld et al. |
| 4,800,019 A | 1/1989 | Bikson et al. |
| 4,810,384 A | 3/1989 | Fabre |
| 4,812,235 A | 3/1989 | Seleman et al. |
| 4,816,160 A | 3/1989 | Ford et al. |
| 4,824,563 A | 4/1989 | Iwahori et al. |
| 4,834,998 A | 5/1989 | Shrikhande |
| 4,839,048 A | 6/1989 | Reed et al. |
| 4,840,227 A | 6/1989 | Schmidt |
| 4,846,970 A | 7/1989 | Bertelsen et al. |
| 4,867,883 A | 9/1989 | Daigger et al. |
| 4,876,006 A | 10/1989 | Ohkubo et al. |
| 4,876,012 A | 10/1989 | Kopp et al. |
| 4,886,601 A | 12/1989 | Iwatsuka et al. |
| 4,888,115 A | 12/1989 | Marinaccio et al. |

| Patent | Date | Inventor |
|---|---|---|
| 4,889,620 A | 12/1989 | Schmit et al. |
| 4,904,426 A | 2/1990 | Lundgard et al. |
| 4,908,114 A | 3/1990 | Ayers |
| 4,919,815 A | 4/1990 | Copa et al. |
| 4,921,610 A | 5/1990 | Ford et al. |
| 4,931,186 A | 6/1990 | Ford et al. |
| 4,933,084 A | 6/1990 | Bandel et al. |
| 4,935,143 A | 6/1990 | Kopp et al. |
| 4,952,317 A | 8/1990 | Culkin |
| 4,963,304 A | 10/1990 | Im et al. |
| 4,966,699 A | 10/1990 | Sasaki et al. |
| 4,968,430 A | 11/1990 | Hildenbrand et al. |
| 4,968,733 A | 11/1990 | Muller et al. |
| 4,969,997 A | 11/1990 | Kluver et al. |
| 4,980,066 A | 12/1990 | Slegers |
| 4,988,444 A | 1/1991 | Applegate et al. |
| 4,999,038 A | 3/1991 | Lundberg |
| 5,002,666 A | 3/1991 | Matsumoto et al. |
| 5,005,430 A | 4/1991 | Kibler et al. |
| 5,015,275 A | 5/1991 | Beck et al. |
| 5,024,762 A | 6/1991 | Ford et al. |
| 5,034,125 A | 7/1991 | Karbachsch et al. |
| 5,043,113 A | 8/1991 | Kafchinski et al. |
| 5,059,317 A | 10/1991 | Marius et al. |
| 5,066,375 A | 11/1991 | Parsi et al. |
| 5,066,401 A | 11/1991 | Muller et al. |
| 5,066,402 A | 11/1991 | Anselme et al. |
| 5,069,065 A | 12/1991 | Sprunt et al. |
| 5,069,353 A | 12/1991 | Espenan |
| 5,075,044 A | 12/1991 | Augem |
| 5,075,065 A | 12/1991 | Effenberger et al. |
| 5,076,925 A | 12/1991 | Roesink et al. |
| 5,079,272 A | 1/1992 | Allegrezza, Jr. et al. |
| 5,080,770 A | 1/1992 | Culkin |
| 5,094,750 A | 3/1992 | Kopp et al. |
| 5,094,867 A | 3/1992 | Detering et al. |
| 5,098,567 A | 3/1992 | Nishiguchi |
| 5,102,550 A | 4/1992 | Pizzino et al. |
| 5,104,535 A | 4/1992 | Cote et al. |
| 5,104,546 A | 4/1992 | Filson et al. |
| H1045 H | 5/1992 | Wilson |
| 5,135,663 A | 8/1992 | Newberth, III et al. |
| 5,137,631 A | 8/1992 | Eckman et al. |
| 5,138,870 A | 8/1992 | Lyssy |
| 5,147,553 A | 9/1992 | Waite |
| 5,151,191 A | 9/1992 | Sunaoka et al. |
| 5,151,193 A | 9/1992 | Grobe et al. |
| 5,156,738 A | 10/1992 | Maxson |
| 5,158,721 A | 10/1992 | Allegrezza, Jr. et al. |
| 5,169,528 A | 12/1992 | Karbachsch et al. |
| 5,169,530 A | 12/1992 | Schucker et al. |
| 5,180,407 A | 1/1993 | DeMarco |
| 5,182,019 A | 1/1993 | Cote et al. |
| 5,186,821 A | 2/1993 | Murphy |
| 5,192,442 A | 3/1993 | Piccirillo et al. |
| 5,192,456 A | 3/1993 | Ishida et al. |
| 5,192,478 A | 3/1993 | Caskey |
| 5,194,149 A | 3/1993 | Selbie et al. |
| 5,198,116 A | 3/1993 | Comstock et al. |
| 5,198,162 A | 3/1993 | Park et al. |
| 5,203,405 A | 4/1993 | Gentry et al. |
| 5,209,852 A * | 5/1993 | Sunaoka et al. ............... 210/636 |
| 5,211,823 A | 5/1993 | Giuffrida et al. |
| 5,221,478 A | 6/1993 | Dhingra et al. |
| 5,227,063 A | 7/1993 | Langerak et al. |
| 5,248,424 A | 9/1993 | Cote et al. |
| 5,262,054 A | 11/1993 | Wheeler |
| 5,269,919 A | 12/1993 | von Medlin |
| 5,271,830 A | 12/1993 | Faivre et al. |
| 5,275,766 A | 1/1994 | Gadkaree et al. |
| 5,286,324 A | 2/1994 | Kawai et al. |
| 5,290,451 A | 3/1994 | Koster et al. |
| 5,290,457 A | 3/1994 | Karbachsch et al. |
| 5,297,420 A | 3/1994 | Gilliland et al. |
| 5,316,671 A | 5/1994 | Murphy |
| 5,320,760 A | 6/1994 | Freund et al. |
| 5,353,630 A | 10/1994 | Soda et al. |
| 5,354,470 A | 10/1994 | Seita et al. |
| 5,358,732 A | 10/1994 | Seifter et al. |
| 5,361,625 A | 11/1994 | Ylvisaker |
| 5,364,527 A | 11/1994 | Zimmermann et al. |
| 5,364,529 A | 11/1994 | Morin et al. |
| 5,374,353 A | 12/1994 | Murphy |
| 5,389,260 A | 2/1995 | Hemp et al. |
| 5,393,433 A | 2/1995 | Espenan et al. |
| 5,396,019 A | 3/1995 | Sartori et al. |
| 5,401,401 A | 3/1995 | Hickok et al. |
| 5,401,405 A | 3/1995 | McDougald |
| 5,403,479 A | 4/1995 | Smith et al. |
| 5,405,528 A | 4/1995 | Selbie et al. |
| 5,411,663 A | 5/1995 | Johnson |
| 5,417,101 A | 5/1995 | Weich |
| 5,419,816 A | 5/1995 | Sampson et al. |
| 5,425,415 A | 6/1995 | Master et al. |
| 5,451,317 A | 9/1995 | Ishida et al. |
| 5,458,779 A | 10/1995 | Odegaard |
| 5,468,397 A | 11/1995 | Barboza et al. |
| 5,470,469 A | 11/1995 | Eckman |
| 5,477,731 A | 12/1995 | Mouton |
| 5,479,590 A | 12/1995 | Lin |
| 5,480,553 A | 1/1996 | Yamamori et al. |
| 5,482,625 A | 1/1996 | Shimizu et al. |
| 5,484,528 A | 1/1996 | Yagi et al. |
| 5,490,939 A | 2/1996 | Gerigk et al. |
| 5,491,023 A | 2/1996 | Tsai et al. |
| 5,501,798 A | 3/1996 | Al-Samadi et al. |
| 5,525,220 A | 6/1996 | Yagi et al. |
| 5,531,848 A | 7/1996 | Brinda et al. |
| 5,531,900 A | 7/1996 | Raghavan et al. |
| 5,543,002 A | 8/1996 | Brinda et al. |
| 5,552,047 A | 9/1996 | Oshida et al. |
| 5,554,283 A | 9/1996 | Brinda et al. |
| 5,556,591 A | 9/1996 | Jallerat et al. |
| 5,575,963 A | 11/1996 | Soffer et al. |
| 5,597,732 A | 1/1997 | Bryan-Brown |
| 5,607,593 A | 3/1997 | Cote et al. ...................... 210/650 |
| 5,626,755 A | 5/1997 | Keyser et al. |
| 5,629,084 A | 5/1997 | Moya |
| 5,633,163 A | 5/1997 | Cameron |
| 5,639,373 A | 6/1997 | Mahendran et al. |
| 5,643,455 A | 7/1997 | Kopp et al. |
| 5,647,988 A | 7/1997 | Kawanishi et al. |
| 5,670,053 A | 9/1997 | Collentro et al. |
| 5,677,360 A | 10/1997 | Yamamori et al. |
| 5,688,460 A | 11/1997 | Ruschke |
| 5,690,830 A | 11/1997 | Ohtani et al. |
| 5,733,456 A | 3/1998 | Okey et al. |
| 5,744,037 A | 4/1998 | Fujimura et al. |
| 5,747,605 A | 5/1998 | Breant et al. |
| 5,766,479 A | 6/1998 | Collentro et al. |
| D396,046 S | 7/1998 | Scheel et al. |
| 5,783,083 A | 7/1998 | Henshaw et al. |
| D396,726 S | 8/1998 | Sadr et al. |
| 5,814,234 A | 9/1998 | Bower et al. |
| D400,890 S | 11/1998 | Gambardella |
| 5,843,069 A | 12/1998 | Butler et al. |
| 5,846,424 A | 12/1998 | Khudenko |
| 5,846,425 A | 12/1998 | Whiteman |
| 5,871,823 A | 2/1999 | Anders et al. |
| 5,888,401 A | 3/1999 | Nguyen |
| 5,895,521 A | 4/1999 | Otsuka et al. |
| 5,895,570 A | 4/1999 | Liang |
| 5,906,739 A | 5/1999 | Osterland et al. |
| 5,906,742 A | 5/1999 | Wang et al. |
| 5,910,250 A | 6/1999 | Mahendran et al. |
| 5,914,039 A | 6/1999 | Mahendran et al. |
| 5,918,264 A | 6/1999 | Drummond et al. |
| 5,942,113 A | 8/1999 | Morimura |
| 5,944,997 A | 8/1999 | Pedersen et al. |
| 5,951,878 A | 9/1999 | Astrom |
| 5,958,243 A | 9/1999 | Lawrence et al. |
| 5,961,830 A | 10/1999 | Barnett |
| 5,968,357 A | 10/1999 | Doelle et al. |
| 5,988,400 A | 11/1999 | Karachevtcev et al. |
| 5,989,428 A | 11/1999 | Goronszy |
| 5,997,745 A | 12/1999 | Tonelli et al. |
| 6,001,254 A | 12/1999 | Espenan et al. |
| 6,007,712 A | 12/1999 | Tanaka et al. |

| | | | |
|---|---|---|---|
| 6,017,451 A | 1/2000 | Kopf | |
| 6,024,872 A | 2/2000 | Mahendran et al. | |
| 6,036,030 A | 3/2000 | Stone et al. | |
| 6,039,872 A | 3/2000 | Wu et al. | |
| 6,042,677 A | 3/2000 | Mahendran et al. | |
| 6,045,698 A | 4/2000 | Cote et al. | |
| 6,045,899 A | 4/2000 | Wang et al. | |
| 6,048,454 A | 4/2000 | Jenkins | |
| 6,048,455 A | 4/2000 | Janik | |
| 6,066,401 A | 5/2000 | Stilburn | |
| 6,071,404 A | 6/2000 | Tsui | |
| 6,074,718 A | 6/2000 | Puglia et al. | |
| 6,077,435 A | 6/2000 | Beck et al. | |
| 6,083,393 A | 7/2000 | Wu et al. | |
| 6,096,213 A | 8/2000 | Radovanovic et al. | |
| 6,113,782 A | 9/2000 | Leonard | |
| 6,120,688 A | 9/2000 | Daly et al. | |
| 6,126,819 A | 10/2000 | Heine et al. | |
| 6,146,747 A | 11/2000 | Wang et al. | |
| 6,149,817 A | 11/2000 | Peterson et al. | |
| 6,156,200 A | 12/2000 | Zha et al. | |
| 6,159,373 A | 12/2000 | Beck et al. | |
| 6,162,020 A | 12/2000 | Kondo | |
| 6,193,890 B1 | 2/2001 | Pedersen et al. | |
| 6,202,475 B1 | 3/2001 | Selbie et al. | |
| 6,214,231 B1 | 4/2001 | Cote et al. | |
| 6,214,232 B1 | 4/2001 | Baurmeister et al. | |
| 6,221,247 B1 | 4/2001 | Nemser et al. | |
| 6,245,239 B1 | 6/2001 | Cote et al. | |
| 6,254,773 B1 | 7/2001 | Biltoft | |
| 6,264,839 B1 | 7/2001 | Mohr et al. | |
| 6,277,512 B1 | 8/2001 | Hamrock et al. | |
| 6,280,626 B1 | 8/2001 | Miyashita et al. | |
| 6,284,135 B1 | 9/2001 | Ookata | |
| 6,290,756 B1 | 9/2001 | Macheras et al. | |
| 6,294,039 B1 | 9/2001 | Mahendran et al. | |
| 6,299,773 B1 | 10/2001 | Takamura et al. | |
| 6,303,026 B1 | 10/2001 | Lindbo | |
| 6,303,035 B1 | 10/2001 | Cote et al. | |
| 6,315,895 B1 | 11/2001 | Summerton et al. | |
| 6,319,411 B1 | 11/2001 | Cote | |
| 6,322,703 B1 | 11/2001 | Taniguchi et al. | |
| 6,324,898 B1 | 12/2001 | Cote et al. | |
| 6,325,928 B1 | 12/2001 | Pedersen et al. | |
| 6,325,938 B1 | 12/2001 | Miyashita et al. | |
| 6,331,248 B1 | 12/2001 | Taniguchi et al. | |
| 6,337,018 B1 | 1/2002 | Mickols | |
| RE37,549 E | 2/2002 | Mahendran et al. | |
| 6,349,835 B1 | 2/2002 | Saux et al. | |
| 6,354,444 B1 | 3/2002 | Mahendran et al. | |
| 6,361,695 B1 | 3/2002 | Husain et al. | |
| 6,368,819 B1 | 4/2002 | Gaddy et al. | |
| 6,372,138 B1 | 4/2002 | Cho et al. | |
| 6,375,848 B1 | 4/2002 | Cote et al. | |
| 6,383,369 B2 | 5/2002 | Elston | |
| 6,387,189 B1 | 5/2002 | Groschl et al. | |
| 6,402,955 B2 | 6/2002 | Ookata | |
| 6,406,629 B1 | 6/2002 | Husain et al. | |
| 6,423,214 B1 | 7/2002 | Lindbo | |
| 6,423,784 B1 | 7/2002 | Hamrock et al. | |
| 6,432,310 B1 | 8/2002 | Andou et al. | |
| 6,440,303 B2 | 8/2002 | Spriegel | |
| D462,699 S | 9/2002 | Johnson et al. | |
| 6,444,124 B1 | 9/2002 | Onyeche et al. | |
| 6,468,430 B1 | 10/2002 | Kimura et al. | |
| 6,471,869 B1 | 10/2002 | Yanou et al. | |
| 6,485,645 B1 | 11/2002 | Husain et al. | |
| 6,495,041 B2 | 12/2002 | Taniguchi et al. | |
| 6,517,723 B1 | 2/2003 | Daigger et al. | |
| 6,524,481 B2 | 2/2003 | Zha et al. | |
| 6,524,733 B1 | 2/2003 | Nonobe | |
| 6,550,747 B2 | 4/2003 | Rabie et al. | |
| 6,555,005 B1 | 4/2003 | Zha et al. | |
| 6,562,237 B1 | 5/2003 | Olaopa | |
| 6,576,136 B1 | 6/2003 | De Moel et al. | |
| 6,592,762 B2 | 7/2003 | Smith | |
| D478,913 S | 8/2003 | Johnson et al. | |
| 6,613,222 B2 | 9/2003 | Mikkelson et al. | |
| 6,620,319 B2 | 9/2003 | Behmann et al. | |
| 6,623,643 B2 | 9/2003 | Chisholm et al. | |
| 6,627,082 B2 | 9/2003 | Del Vecchio et al. | |
| 6,632,358 B1 | 10/2003 | Suga et al. | |
| 6,635,179 B1 | 10/2003 | Summerton et al. | |
| 6,641,733 B2 | 11/2003 | Zha et al. | |
| 6,645,374 B2 | 11/2003 | Cote et al. | |
| 6,656,356 B2 | 12/2003 | Gungerich et al. | |
| 6,682,652 B2 | 1/2004 | Mahendran et al. | |
| 6,685,832 B2 | 2/2004 | Mahendran et al. | |
| 6,696,465 B2 | 2/2004 | Dellaria et al. | |
| 6,702,561 B2 | 3/2004 | Stillig et al. | |
| 6,706,185 B2 | 3/2004 | Goel et al. | |
| 6,706,189 B2 | 3/2004 | Rabie et al. | |
| 6,708,957 B2 | 3/2004 | Cote et al. | |
| 6,712,970 B1 | 3/2004 | Trivedi | |
| 6,721,529 B2 | 4/2004 | Chen et al. | |
| 6,723,242 B1 | 4/2004 | Ohkata et al. | |
| 6,723,758 B2 | 4/2004 | Stone et al. | |
| 6,727,305 B1 | 4/2004 | Pavez Aranguiz | |
| 6,743,362 B1 | 6/2004 | Porteous et al. | |
| 6,755,970 B1 | 6/2004 | Knappe et al. | |
| 6,758,972 B2 | 7/2004 | Vriens et al. | |
| 6,761,826 B2 | 7/2004 | Bender | |
| 6,770,202 B1 | 8/2004 | Kidd et al. | |
| 6,780,466 B2 | 8/2004 | Grangeon et al. | |
| 6,783,008 B2 | 8/2004 | Zha et al. | |
| 6,790,347 B2 | 9/2004 | Jeong et al. | |
| 6,790,912 B2 | 9/2004 | Blong | |
| 6,805,806 B2 | 10/2004 | Arnaud | |
| 6,808,629 B2 | 10/2004 | Wouters-Wasiak et al. | |
| 6,811,696 B2 | 11/2004 | Wang et al. | |
| 6,814,861 B2 | 11/2004 | Husain et al. | |
| 6,821,420 B2 | 11/2004 | Zha et al. | |
| 6,830,782 B2 | 12/2004 | Kanazawa | |
| 6,840,251 B2 | 1/2005 | Gill et al. | |
| 6,841,070 B2 | 1/2005 | Zha et al. | |
| 6,861,466 B2 | 3/2005 | Dadalas et al. | |
| 6,863,816 B2 | 3/2005 | Austin et al. | |
| 6,863,817 B2 | 3/2005 | Liu et al. | |
| 6,863,818 B2 | 3/2005 | Daigger et al. | |
| 6,863,823 B2 | 3/2005 | Cote | |
| 6,869,534 B2 | 3/2005 | McDowell et al. | |
| 6,872,305 B2 | 3/2005 | Johnson et al. | |
| 6,881,343 B2 | 4/2005 | Rabie et al. | |
| 6,884,350 B2 | 4/2005 | Muller | |
| 6,884,375 B2 | 4/2005 | Wang et al. | |
| 6,890,435 B2 | 5/2005 | Ji et al. | |
| 6,890,645 B2 | 5/2005 | Disse et al. | |
| 6,893,568 B1 | 5/2005 | Janson et al. | |
| 6,899,812 B2 | 5/2005 | Cote et al. | |
| 6,936,085 B2 | 8/2005 | DeMarco | |
| 6,946,073 B2 | 9/2005 | Daigger et al. | |
| 6,952,258 B2 | 10/2005 | Ebert et al. | |
| 6,955,762 B2 | 10/2005 | Gallagher et al. | |
| 6,962,258 B2 | 11/2005 | Zha et al. | |
| 6,964,741 B2 | 11/2005 | Mahendran et al. | |
| 6,969,465 B2 | 11/2005 | Zha et al. | |
| 6,974,554 B2 | 12/2005 | Cox et al. | |
| 6,994,867 B1 | 2/2006 | Hossainy et al. | |
| 7,005,100 B2 | 2/2006 | Lowell | |
| 7,014,763 B2 | 3/2006 | Johnson et al. | |
| 7,018,530 B2 | 3/2006 | Pollock | |
| 7,018,533 B2 | 3/2006 | Johnson et al. | |
| 7,022,233 B2 | 4/2006 | Chen | |
| 7,041,728 B2 | 5/2006 | Zipplies et al. | |
| 7,052,610 B2 | 5/2006 | Janson et al. | |
| 7,083,733 B2 | 8/2006 | Freydina et al. | |
| 7,087,173 B2 | 8/2006 | Cote et al. | |
| 7,122,121 B1 | 10/2006 | Ji | |
| 7,147,777 B1 | 12/2006 | Porteous | |
| 7,147,778 B1 | 12/2006 | DiMassimo et al. | |
| 7,160,455 B2 | 1/2007 | Taniguchi et al. | |
| 7,160,463 B2 | 1/2007 | Beck et al. | |
| 7,160,464 B2 | 1/2007 | Lee et al. | |
| 7,172,699 B1 | 2/2007 | Trivedi et al. | |
| 7,172,701 B2 | 2/2007 | Gaid et al. | |
| 7,186,344 B2 | 3/2007 | Hughes | |
| 7,208,091 B2 | 4/2007 | Pind et al. | |
| 7,223,340 B2 | 5/2007 | Zha et al. | |

| | | |
|---|---|---|
| 7,226,541 B2 | 6/2007 | Muller et al. |
| 7,247,238 B2 | 7/2007 | Mullette et al. |
| 7,264,716 B2 | 9/2007 | Johnson et al. |
| 7,279,100 B2 | 10/2007 | Devine |
| 7,279,215 B2 | 10/2007 | Hester et al. |
| 7,300,022 B2 | 11/2007 | Muller |
| 7,314,563 B2 | 1/2008 | Cho et al. |
| 7,329,344 B2 | 2/2008 | Jordan et al. |
| 7,344,645 B2 | 3/2008 | Beck et al. |
| 7,361,274 B2 | 4/2008 | Lazaredes |
| 7,378,024 B2 | 5/2008 | Bartels et al. |
| 7,387,723 B2 | 6/2008 | Jordan |
| 7,404,896 B2 | 7/2008 | Muller |
| 7,410,584 B2 | 8/2008 | Devine |
| 7,455,765 B2 | 11/2008 | Elefritz et al. |
| 7,481,933 B2 | 1/2009 | Barnes |
| 7,507,274 B2 | 3/2009 | Tonkovich et al. |
| 7,510,655 B2 | 3/2009 | Barnes |
| 7,531,042 B2 | 5/2009 | Murkute et al. |
| 7,563,363 B2 | 7/2009 | Kuzma |
| 7,591,950 B2 | 9/2009 | Zha et al. |
| 7,632,439 B2 | 12/2009 | Mullette et al. |
| 7,648,634 B2 | 1/2010 | Probst |
| 7,662,212 B2 | 2/2010 | Mullette et al. |
| 7,708,887 B2 | 5/2010 | Johnson et al. |
| 7,713,413 B2 | 5/2010 | Barnes |
| 7,718,057 B2 | 5/2010 | Jordan et al. |
| 7,718,065 B2 | 5/2010 | Jordan |
| 7,722,769 B2 | 5/2010 | Jordan et al. |
| 7,761,826 B1 | 7/2010 | Thanvantri et al. |
| 7,819,956 B2 | 10/2010 | Muller |
| 7,850,851 B2 | 12/2010 | Zha et al. |
| 7,862,719 B2 | 1/2011 | McMahon et al. |
| 7,931,463 B2 | 4/2011 | Cox et al. |
| 7,938,966 B2 | 5/2011 | Johnson |
| 2001/0047962 A1 | 12/2001 | Zha et al. |
| 2001/0052494 A1 | 12/2001 | Cote et al. |
| 2002/0027111 A1 | 3/2002 | Ando et al. |
| 2002/0070157 A1 | 6/2002 | Yamada |
| 2002/0117444 A1 | 8/2002 | Mikkelson et al. |
| 2002/0148767 A1 | 10/2002 | Johnson et al. |
| 2002/0153313 A1 | 10/2002 | Cote |
| 2002/0185435 A1 | 12/2002 | Husain et al. |
| 2002/0189999 A1 | 12/2002 | Espenan et al. |
| 2002/0195390 A1 | 12/2002 | Zha et al. |
| 2003/0038080 A1 | 2/2003 | Vriens et al. |
| 2003/0042199 A1 | 3/2003 | Smith |
| 2003/0052055 A1 | 3/2003 | Akamatsu et al. |
| 2003/0056919 A1 | 3/2003 | Beck |
| 2003/0057155 A1 | 3/2003 | Husain et al. |
| 2003/0075495 A1 | 4/2003 | Dannstrom et al. |
| 2003/0121855 A1 | 7/2003 | Kopp |
| 2003/0127388 A1 | 7/2003 | Ando et al. |
| 2003/0146153 A1 | 8/2003 | Cote et al. |
| 2003/0150807 A1 | 8/2003 | Bartels et al. |
| 2003/0159988 A1 | 8/2003 | Daigger et al. |
| 2003/0178365 A1 | 9/2003 | Zha et al. |
| 2003/0196955 A1 | 10/2003 | Hughes |
| 2003/0226797 A1 | 12/2003 | Phelps |
| 2003/0234221 A1 | 12/2003 | Johnson et al. |
| 2004/0007523 A1 | 1/2004 | Gabon et al. |
| 2004/0007525 A1 | 1/2004 | Rabie et al. |
| 2004/0035770 A1 | 2/2004 | Edwards et al. |
| 2004/0045893 A1 | 3/2004 | Watanabe et al. |
| 2004/0050791 A1 | 3/2004 | Herczeg |
| 2004/0055974 A1 | 3/2004 | Del Vecchio et al. |
| 2004/0084369 A1 | 5/2004 | Zha et al. |
| 2004/0108268 A1 | 6/2004 | Liu et al. |
| 2004/0112831 A1 | 6/2004 | Rabie et al. |
| 2004/0139992 A1 | 7/2004 | Murkute et al. |
| 2004/0145076 A1 | 7/2004 | Zha et al. |
| 2004/0149655 A1 | 8/2004 | Petrucco et al. |
| 2004/0154671 A1 | 8/2004 | Martins et al. |
| 2004/0168978 A1 | 9/2004 | Gray |
| 2004/0168979 A1 | 9/2004 | Zha et al. |
| 2004/0173525 A1 | 9/2004 | Hunniford et al. |
| 2004/0178154 A1 | 9/2004 | Zha et al. |
| 2004/0188341 A1 | 9/2004 | Zha et al. |
| 2004/0211726 A1 | 10/2004 | Baig et al. |
| 2004/0217053 A1* | 11/2004 | Zha et al. ........................ 210/636 |
| 2004/0222158 A1 | 11/2004 | Husain et al. |
| 2004/0232076 A1 | 11/2004 | Zha et al. |
| 2004/0238442 A1 | 12/2004 | Johnson et al. |
| 2004/0245174 A1 | 12/2004 | Takayama et al. |
| 2005/0006308 A1* | 1/2005 | Cote et al. ........................ 210/636 |
| 2005/0023219 A1 | 2/2005 | Kirker et al. |
| 2005/0029185 A1 | 2/2005 | Muller |
| 2005/0029186 A1 | 2/2005 | Muller |
| 2005/0032982 A1 | 2/2005 | Muller |
| 2005/0045557 A1 | 3/2005 | Daigger et al. |
| 2005/0053878 A1 | 3/2005 | Bruun et al. |
| 2005/0061725 A1 | 3/2005 | Liu et al. |
| 2005/0077227 A1 | 4/2005 | Kirker et al. |
| 2005/0098494 A1 | 5/2005 | Mullette et al. |
| 2005/0103722 A1 | 5/2005 | Freydina et al. |
| 2005/0109692 A1 | 5/2005 | Zha et al. |
| 2005/0115880 A1 | 6/2005 | Pollock |
| 2005/0115899 A1 | 6/2005 | Liu et al. |
| 2005/0121389 A1 | 6/2005 | Janson et al. |
| 2005/0126963 A1 | 6/2005 | Phagoo et al. |
| 2005/0139538 A1 | 6/2005 | Lazaredes |
| 2005/0184008 A1 | 8/2005 | Schacht et al. |
| 2005/0194305 A1 | 9/2005 | Vido et al. |
| 2005/0194310 A1 | 9/2005 | Yamamoto et al. |
| 2005/0194315 A1 | 9/2005 | Adams et al. |
| 2005/0258098 A1 | 11/2005 | Vincent et al. |
| 2006/0000775 A1 | 1/2006 | Zha et al. |
| 2006/0021929 A1 | 2/2006 | Mannheim et al. |
| 2006/0065596 A1 | 3/2006 | Kent et al. |
| 2006/0081533 A1 | 4/2006 | Khudenko |
| 2006/0131234 A1 | 6/2006 | Zha et al. |
| 2006/0201876 A1 | 9/2006 | Jordan |
| 2006/0201879 A1 | 9/2006 | Den Boestert et al. |
| 2006/0249448 A1 | 11/2006 | Fujishima et al. |
| 2006/0249449 A1 | 11/2006 | Nakhla et al. |
| 2006/0261007 A1 | 11/2006 | Zha et al. |
| 2006/0273007 A1 | 12/2006 | Zha et al. |
| 2006/0273038 A1 | 12/2006 | Syed et al. |
| 2007/0007205 A1 | 1/2007 | Johnson et al. |
| 2007/0007207 A1 | 1/2007 | Mahendran et al. |
| 2007/0007214 A1* | 1/2007 | Zha et al. ........................ 210/718 |
| 2007/0039888 A1 | 2/2007 | Ginzburg et al. |
| 2007/0045183 A1 | 3/2007 | Murphy |
| 2007/0051679 A1 | 3/2007 | Adams et al. |
| 2007/0056904 A1 | 3/2007 | Hogt et al. |
| 2007/0056905 A1 | 3/2007 | Beck et al. |
| 2007/0075017 A1 | 4/2007 | Kuzma |
| 2007/0075021 A1 | 4/2007 | Johnson |
| 2007/0084791 A1 | 4/2007 | Jordan et al. |
| 2007/0084795 A1 | 4/2007 | Jordan |
| 2007/0108125 A1 | 5/2007 | Cho et al. |
| 2007/0131614 A1 | 6/2007 | Knappe et al. |
| 2007/0138090 A1 | 6/2007 | Jordan et al. |
| 2007/0170112 A1 | 7/2007 | Elefritz et al. |
| 2007/0181496 A1 | 8/2007 | Zuback |
| 2007/0227973 A1 | 10/2007 | Zha et al. |
| 2008/0093297 A1 | 4/2008 | Gock et al. |
| 2008/0156745 A1 | 7/2008 | Zha et al. |
| 2008/0179249 A1 | 7/2008 | Beck et al. |
| 2008/0190846 A1 | 8/2008 | Cox et al. |
| 2008/0203017 A1 | 8/2008 | Zha et al. |
| 2008/0257822 A1 | 10/2008 | Johnson |
| 2008/0277340 A1 | 11/2008 | Hong et al. |
| 2009/0001018 A1 | 1/2009 | Zha et al. |
| 2009/0194477 A1 | 8/2009 | Hashimoto |
| 2009/0223895 A1 | 9/2009 | Zha et al. |
| 2009/0255873 A1 | 10/2009 | Biltoft et al. |
| 2010/0000941 A1 | 1/2010 | Muller |
| 2010/0012585 A1 | 1/2010 | Zha et al. |
| 2010/0025320 A1 | 2/2010 | Johnson |
| 2010/0051545 A1 | 3/2010 | Johnson et al. |
| 2010/0170847 A1 | 7/2010 | Zha et al. |
| 2010/0200503 A1 | 8/2010 | Zha et al. |
| 2010/0300968 A1 | 12/2010 | Liu et al. |
| 2010/0326906 A1 | 12/2010 | Barnes |
| 2011/0023913 A1 | 2/2011 | Fulling |
| 2011/0049047 A1 | 3/2011 | Cumin et al. |
| 2011/0056522 A1 | 3/2011 | Zauner et al. |

| | | | | | | |
|---|---|---|---|---|---|---|
| 2011/0100907 | A1 | 5/2011 | Zha et al. | FR | 2762834 A1 | 11/1998 |
| 2011/0114557 | A2 | 5/2011 | Johnson et al. | GB | 702911 | 1/1954 |
| 2011/0127209 | A1 | 6/2011 | Rogers et al. | GB | 996195 A | 6/1965 |
| 2011/0132826 | A1 | 6/2011 | Muller et al. | GB | 2253572 | 9/1992 |
| 2011/0139715 | A1 | 6/2011 | Zha et al. | JP | 52-078677 A | 7/1977 |
| 2011/0192783 | A1 | 8/2011 | Cox et al. | JP | 53-5077 | 1/1978 |
| 2011/0198283 | A1 | 8/2011 | Zha et al. | JP | 53108882 A | 9/1978 |
| 2012/0091602 | A1 | 4/2012 | Cumin et al. | JP | 54162684 A | 12/1979 |
| | | | | JP | 55099703 A | 7/1980 |
| FOREIGN PATENT DOCUMENTS | | | | JP | 55129107 A | 10/1980 |
| | | | | JP | 55129155 A | 10/1980 |
| AU | 77066/87 A | | 2/1988 | JP | 56021604 A | 2/1981 |
| AU | 762091 B2 | | 6/2003 | JP | 56118701 A | 9/1981 |
| AU | 2004289373 A1 | | 5/2005 | JP | 56121685 A | 9/1981 |
| CA | 2460207 A1 | | 3/2003 | JP | 57190697 A | 11/1982 |
| CA | 2531764 A1 | | 3/2005 | JP | 58088007 A | 5/1983 |
| CN | 86104888 A | | 2/1988 | JP | 60019002 A | 1/1985 |
| CN | 1050770 | | 1/1995 | JP | 60-206412 A | 10/1985 |
| CN | 2204898 Y | | 8/1995 | JP | 60260628 A | 12/1985 |
| CN | 2236049 Y | | 9/1996 | JP | 61097005 A | 5/1986 |
| CN | 1159769 A | | 9/1997 | JP | 61097006 A | 5/1986 |
| CN | 1244814 A | | 2/2000 | JP | 61107905 A | 5/1986 |
| CN | 1249698 A | | 4/2000 | JP | 61167406 A | 7/1986 |
| CN | 1265636 A | | 9/2000 | JP | 61167407 A | 7/1986 |
| CN | 1319032 A | | 10/2001 | JP | 61171504 A | 8/1986 |
| CN | 1468140 A | | 1/2004 | JP | 61192309 A | 8/1986 |
| CN | 1541757 A | | 11/2004 | JP | 61222510 A | 10/1986 |
| DE | 3904544 A1 | | 8/1990 | JP | 61242607 A | 10/1986 |
| DE | 4117281 A1 | | 1/1992 | JP | 61249505 A | 11/1986 |
| DE | 4113420 A1 | | 10/1992 | JP | 61257203 A | 11/1986 |
| DE | 4117422 C1 | | 11/1992 | JP | 61263605 A | 11/1986 |
| DE | 4326603 A1 | | 2/1995 | JP | 61291007 A | 12/1986 |
| DE | 19503060 A1 | | 8/1996 | JP | 61293504 A | 12/1986 |
| DE | 29804927 U1 | | 6/1998 | JP | 62004408 A | 1/1987 |
| DE | 29906389 U1 | | 6/1999 | JP | 62068828 A | 3/1987 |
| DE | 10045227 C1 | | 2/2002 | JP | 62114609 A | 5/1987 |
| DE | 10209170 C1 | | 8/2003 | JP | 62140607 A | 6/1987 |
| DE | 202004012693 U1 | | 10/2004 | JP | 62144708 A | 6/1987 |
| EP | 012557 B1 | | 2/1983 | JP | 62163708 A | 7/1987 |
| EP | 126714 A2 | | 11/1984 | JP | 62179540 A | 8/1987 |
| EP | 050447 B1 | | 10/1985 | JP | 62237908 A | 10/1987 |
| EP | 194735 A2 | | 9/1986 | JP | 62250908 A | 10/1987 |
| EP | 250337 A1 | | 12/1987 | JP | 62187606 | 11/1987 |
| EP | 327025 A1 | | 8/1989 | JP | 62262710 | 11/1987 |
| EP | 344633 A1 | | 12/1989 | JP | 63-93307 | 4/1988 |
| EP | 090383 B1 | | 5/1990 | JP | 63097634 A | 4/1988 |
| EP | 407900 A2 | | 1/1991 | JP | 63099246 A | 4/1988 |
| EP | 463627 A2 | | 1/1992 | JP | 63143905 A | 6/1988 |
| EP | 0464321 A1 | | 1/1992 | JP | 63-1602 | 7/1988 |
| EP | 492942 A2 | | 7/1992 | JP | 63171607 A | 7/1988 |
| EP | 518250 B1 | | 12/1992 | JP | 63180254 A | 7/1988 |
| EP | 547575 A1 | | 6/1993 | JP | S63-38884 | 10/1988 |
| EP | 280052 B1 | | 7/1994 | JP | 64-075542 A | 3/1989 |
| EP | 395133 B1 | | 2/1995 | JP | 1-501046 T | 4/1989 |
| EP | 662341 A1 | | 7/1995 | JP | 1111494 | 4/1989 |
| EP | 492446 B1 | | 11/1995 | JP | 01151906 A | 6/1989 |
| EP | 430082 B1 | | 6/1996 | JP | 01-307409 A | 12/1989 |
| EP | 734758 A1 | | 10/1996 | JP | 02-017925 | 1/1990 |
| EP | 763758 A1 | | 3/1997 | JP | 02017924 | 1/1990 |
| EP | 824956 A2 | | 2/1998 | JP | 02026625 A | 1/1990 |
| EP | 848194 A2 | | 6/1998 | JP | 2031200 | 2/1990 |
| EP | 855214 A1 | | 7/1998 | JP | 02040296 A | 2/1990 |
| EP | 627255 B1 | | 1/1999 | JP | 02107318 A | 4/1990 |
| EP | 911073 A1 | | 4/1999 | JP | 02126922 A | 5/1990 |
| EP | 920904 A2 | | 6/1999 | JP | 02144132 A | 6/1990 |
| EP | 0937494 A2 | | 8/1999 | JP | 02164423 A | 6/1990 |
| EP | 1034835 A1 | | 9/2000 | JP | 02174918 A | 7/1990 |
| EP | 1052012 A1 | | 11/2000 | JP | 02241523 A | 9/1990 |
| EP | 1156015 A1 | | 11/2001 | JP | 02277528 A | 11/1990 |
| EP | 1300186 A1 | | 4/2003 | JP | 02284035 A | 11/1990 |
| EP | 1349644 B1 | | 10/2003 | JP | 03018373 A | 1/1991 |
| EP | 1350555 A1 | | 10/2003 | JP | 03028797 A | 2/1991 |
| EP | 1236503 B1 | | 8/2004 | JP | 03-086529 A | 4/1991 |
| EP | 1445240 | | 8/2004 | JP | 03110445 A | 5/1991 |
| EP | 1466658 A1 | | 10/2004 | JP | 04108518 A | 4/1992 |
| EP | 1659171 A1 | | 5/2006 | JP | 04110023 A | 4/1992 |
| EP | 1420874 B1 | | 1/2011 | JP | 4-190889 A | 7/1992 |
| FR | 2620712 A1 | | 3/1989 | JP | 04187224 A | 7/1992 |
| FR | 2674448 A1 | | 10/1992 | JP | 4-256425 A | 9/1992 |
| FR | 2699424 A1 | | 6/1994 | | | |

| | | | | | | |
|---|---|---|---|---|---|---|
| JP | 04250898 A | 9/1992 | | JP | 10076264 A | 3/1998 |
| JP | 04256424 A | 9/1992 | | JP | 10-085566 A | 4/1998 |
| JP | 04265128 A | 9/1992 | | JP | 10085562 A | 4/1998 |
| JP | 04293527 A | 10/1992 | | JP | 10085565 A | 4/1998 |
| JP | 04310223 A | 11/1992 | | JP | 10156149 A | 6/1998 |
| JP | 04317793 A | 11/1992 | | JP | 10180048 A | 7/1998 |
| JP | 04334530 A | 11/1992 | | JP | 10225685 A | 8/1998 |
| JP | 04348252 A | 12/1992 | | JP | 10-249171 A | 9/1998 |
| JP | 05023557 A | 2/1993 | | JP | 10235168 A | 9/1998 |
| JP | 05096136 A | 4/1993 | | JP | 10286441 A | 10/1998 |
| JP | 05137977 A | 6/1993 | | JP | 10328538 A | 12/1998 |
| JP | 05157654 A | 6/1993 | | JP | 11005023 A | 1/1999 |
| JP | 05161831 A | 6/1993 | | JP | 11-031025 A | 2/1999 |
| JP | 05184884 A | 7/1993 | | JP | 11028339 A | 2/1999 |
| JP | 05279447 A | 10/1993 | | JP | 11028467 A | 2/1999 |
| JP | 05285348 A | 11/1993 | | JP | 11033365 A | 2/1999 |
| JP | 05305221 A | 11/1993 | | JP | 11033367 A | 2/1999 |
| JP | 06-027215 A | 2/1994 | | JP | 11076769 A | 3/1999 |
| JP | 06071120 A | 3/1994 | | JP | 11076770 A | 3/1999 |
| JP | 06114240 A | 4/1994 | | JP | 11090189 A | 4/1999 |
| JP | 06170364 A | 6/1994 | | JP | 11156166 A | 6/1999 |
| JP | 06-190250 A | 7/1994 | | JP | 11156360 A | 6/1999 |
| JP | 06-238273 A | 8/1994 | | JP | 11165200 A | 6/1999 |
| JP | 06218237 A | 8/1994 | | JP | 11-179171 A | 7/1999 |
| JP | 06-292820 A | 10/1994 | | JP | 11-309351 A | 11/1999 |
| JP | 06277469 A | 10/1994 | | JP | 11300177 A | 11/1999 |
| JP | 06285496 A | 10/1994 | | JP | 11302438 A | 11/1999 |
| JP | 06343837 A | 12/1994 | | JP | 11319501 A | 11/1999 |
| JP | 07000770 A | 1/1995 | | JP | 11319507 A | 11/1999 |
| JP | 07024272 A | 1/1995 | | JP | 11333265 A | 12/1999 |
| JP | 07047247 A | 2/1995 | | JP | 2000000439 A | 1/2000 |
| JP | 07068139 A | 3/1995 | | JP | 2000-51670 | 2/2000 |
| JP | 07136470 A | 5/1995 | | JP | 2000051669 A | 2/2000 |
| JP | 07136471 A | 5/1995 | | JP | 2000061466 A | 2/2000 |
| JP | 07155564 A | 6/1995 | | JP | 200079390 A | 3/2000 |
| JP | 07155758 A | 6/1995 | | JP | 2000070684 A | 3/2000 |
| JP | 7-39921 | 7/1995 | | JP | 2000-093758 | 4/2000 |
| JP | 07178323 A | 7/1995 | | JP | 2000-157845 | 6/2000 |
| JP | 07185268 A | 7/1995 | | JP | 2000157850 A | 6/2000 |
| JP | 07185270 A | 7/1995 | | JP | 2000185220 A | 7/2000 |
| JP | 07185271 A | 7/1995 | | JP | 2000189958 A | 7/2000 |
| JP | 07185272 A | 7/1995 | | JP | 2000233020 A | 8/2000 |
| JP | 07-204635 A | 8/1995 | | JP | 2000237548 A | 9/2000 |
| JP | 07236819 A | 9/1995 | | JP | 2000300968 A | 10/2000 |
| JP | 07-256253 | 10/1995 | | JP | 2000317276 A | 11/2000 |
| JP | 07251043 A | 10/1995 | | JP | 2000-334276 A | 12/2000 |
| JP | 07275665 A | 10/1995 | | JP | 2000342932 A | 12/2000 |
| JP | 07289860 A | 11/1995 | | JP | 2001009246 A | 1/2001 |
| JP | 07303895 A | 11/1995 | | JP | 2001070967 A | 3/2001 |
| JP | 07313973 A | 12/1995 | | JP | 2001079366 A | 3/2001 |
| JP | 08010585 A | 1/1996 | | JP | 2001079367 A | 3/2001 |
| JP | 8039089 A | 2/1996 | | JP | 2001104760 A | 4/2001 |
| JP | 08-197053 A | 8/1996 | | JP | 2001120963 A | 5/2001 |
| JP | 08323161 A | 12/1996 | | JP | 2001-510396 T | 7/2001 |
| JP | 08332357 A | 12/1996 | | JP | 2001179059 A | 7/2001 |
| JP | 09000890 A | 1/1997 | | JP | 2001179060 A | 7/2001 |
| JP | 09 038470 | 2/1997 | | JP | 2001190937 A | 7/2001 |
| JP | 09038648 A | 2/1997 | | JP | 2001190938 A | 7/2001 |
| JP | 09-075689 A | 3/1997 | | JP | 2001205055 A | 7/2001 |
| JP | 09072993 A | 3/1997 | | JP | 2001232160 A | 8/2001 |
| JP | 09099227 A | 4/1997 | | JP | 2001-269546 | 10/2001 |
| JP | 09103655 A | 4/1997 | | JP | 2002011472 A | 1/2002 |
| JP | 9103661 A | 4/1997 | | JP | 2002143849 A | 5/2002 |
| JP | 9117647 A | 5/1997 | | JP | 2002177746 A | 6/2002 |
| JP | 9138298 A | 5/1997 | | JP | 3302992 B2 | 7/2002 |
| JP | 09141063 A | 6/1997 | | JP | 2002-527229 A | 8/2002 |
| JP | 09155345 A | 6/1997 | | JP | 2002525197 T | 8/2002 |
| JP | 09187628 A | 7/1997 | | JP | 2002263407 A | 9/2002 |
| JP | 09192458 A | 7/1997 | | JP | 2002-336663 | 11/2002 |
| JP | 09220569 A | 8/1997 | | JP | 2003024751 | 1/2003 |
| JP | 09271641 A | 10/1997 | | JP | 2003-053157 A | 2/2003 |
| JP | 09-313902 A | 12/1997 | | JP | 2003047830 A | 2/2003 |
| JP | 09324067 A | 12/1997 | | JP | 2003053160 A | 2/2003 |
| JP | 10-015365 A | 1/1998 | | JP | 200371254 A | 3/2003 |
| JP | 10024222 A | 1/1998 | | JP | 2003062436 A | 3/2003 |
| JP | 10033955 A | 2/1998 | | JP | 2003135935 A | 5/2003 |
| JP | 10048466 A | 2/1998 | | JP | 2003190976 A | 7/2003 |
| JP | 10 076144 | 3/1998 | | JP | 2003-265597 | 9/2003 |
| JP | 10066972 A | 3/1998 | | JP | 2003-275548 A | 9/2003 |

| | | | |
|---|---|---|---|
| JP | 2003266072 A | 9/2003 | |
| JP | 2003275759 A | 9/2003 | |
| JP | 2003340250 A | 12/2003 | |
| JP | 2004-008981 | 1/2004 | |
| JP | 2004073950 A | 3/2004 | |
| JP | 2004-230287 A | 8/2004 | |
| JP | 2004216263 A | 8/2004 | |
| JP | 2004230280 A | 8/2004 | |
| JP | 2004249168 A | 9/2004 | |
| JP | 2004-322100 A | 11/2004 | |
| JP | 2004-536710 A | 12/2004 | |
| JP | 2004337730 A | 12/2004 | |
| JP | 2005-502467 A | 1/2005 | |
| JP | 2005-087887 A | 4/2005 | |
| JP | 2005144291 A | 6/2005 | |
| JP | 2005154551 A | 6/2005 | |
| JP | 2005279447 A | 10/2005 | |
| JP | 2006-116495 | 5/2006 | |
| JP | 2007-547083 | 8/2010 | |
| JP | 4833353 B2 | 12/2011 | |
| KP | 20-0232145 | 7/2001 | |
| KR | 1020020067227 | 8/2002 | |
| KR | 20-0295350 | 11/2002 | |
| KR | 2002-0090967 | 12/2002 | |
| KR | 2003-033812 | 5/2003 | |
| KR | 2003-060625 | 7/2003 | |
| KR | 2005-063478 | 6/2005 | |
| NL | 1006390 C2 | 12/1998 | |
| NL | 1020491 | 10/2003 | |
| NL | 1021197 | 10/2003 | |
| NO | 20053769 A | 2/2006 | |
| NZ | 510394 A | 5/2003 | |
| NZ | 537874 A | 2/2007 | |
| TW | 347343 | 12/1998 | |
| WO | 8501449 A1 | 4/1985 | |
| WO | 8605116 A1 | 9/1986 | |
| WO | 8605705 A1 | 10/1986 | |
| WO | 8800494 A1 | 1/1988 | |
| WO | 8801529 A1 | 3/1988 | |
| WO | 8801895 A1 | 3/1988 | |
| WO | 8806200 A1 | 8/1988 | |
| WO | 8900880 A1 | 2/1989 | |
| WO | 9000434 A1 | 1/1990 | |
| WO | 9104783 A1 | 4/1991 | |
| WO | 9116124 A1 | 10/1991 | |
| WO | 9302779 A1 | 2/1993 | |
| WO | 9315827 A1 | 8/1993 | |
| WO | 9323152 A1 | 11/1993 | |
| WO | 9411094 A1 | 5/1994 | |
| WO | 9511736 A1 | 5/1995 | |
| WO | 9534424 A1 | 12/1995 | |
| WO | 9603202 A1 | 2/1996 | |
| WO | 9607470 A1 | 3/1996 | |
| WO | 9628236 A1 | 9/1996 | |
| WO | 9629142 A1 | 9/1996 | |
| WO | 9641676 A1 | 12/1996 | |
| WO | 9706862 A2 | 2/1997 | |
| WO | 9822204 A1 | 5/1998 | |
| WO | 9825694 A1 | 6/1998 | |
| WO | 9828066 A1 | 7/1998 | |
| WO | 9853902 A1 | 12/1998 | |
| WO | 9901207 A1 | 1/1999 | |
| WO | 99-55448 A1 | 11/1999 | |
| WO | 9959707 A1 | 11/1999 | |
| WO | WO0018498 A1 | 4/2000 | |
| WO | 0030742 A1 | 6/2000 | |
| WO | 0100307 A2 | 1/2001 | |
| WO | 0105715 A1 | 1/2001 | |
| WO | 0108790 A1 | 2/2001 | |
| WO | 0119414 A1 | 3/2001 | |
| WO | 0132299 A1 | 5/2001 | |
| WO | 0136075 A1 | 5/2001 | |
| WO | 0143856 A1 | 6/2001 | |
| WO | 0145829 A1 | 6/2001 | |
| WO | 0226363 A2 | 4/2002 | |
| WO | 0230550 A1 | 4/2002 | |
| WO | 0240140 A1 | 5/2002 | |
| WO | 0247800 A1 | 6/2002 | |
| WO | 03000389 A2 | 1/2003 | |
| WO | 03013706 A1 | 2/2003 | |
| WO | WO 03024575 A1 * | 3/2003 | |
| WO | 03053552 A1 | 7/2003 | |
| WO | 03057632 A1 | 7/2003 | |
| WO | 03059495 A1 | 7/2003 | |
| WO | 03068374 A1 | 8/2003 | |
| WO | 03095078 A1 | 11/2003 | |
| WO | 2004018084 A1 | 3/2004 | |
| WO | 2004024304 A2 | 3/2004 | |
| WO | 2004033078 A1 | 4/2004 | |
| WO | WO2004050221 A1 | 6/2004 | |
| WO | 2004056458 A3 | 7/2004 | |
| WO | 2004078327 A1 | 9/2004 | |
| WO | 2004101120 A1 | 11/2004 | |
| WO | 2005005028 A1 | 1/2005 | |
| WO | 2005021140 A1 | 3/2005 | |
| WO | 2005028085 A1 | 3/2005 | |
| WO | 2005028086 A1 | 3/2005 | |
| WO | 2005037414 A1 | 4/2005 | |
| WO | 2005046849 A1 | 5/2005 | |
| WO | 2005077499 A1 | 8/2005 | |
| WO | 2005082498 A1 | 9/2005 | |
| WO | 2005107929 A2 | 11/2005 | |
| WO | 2006026814 A1 | 3/2006 | |
| WO | 2006029456 A1 | 3/2006 | |
| WO | 2006029465 | 3/2006 | |
| WO | 2006047814 A1 | 5/2006 | |
| WO | 2006066350 A1 | 6/2006 | |
| WO | 2007053528 A2 | 5/2007 | |
| WO | 2007065956 A1 | 6/2007 | |
| WO | 2007135087 A1 | 11/2007 | |
| WO | 2008025077 A1 | 3/2008 | |
| WO | 2008034570 A1 | 3/2008 | |
| WO | 2008071516 A1 | 6/2008 | |
| WO | 2008141080 A1 | 11/2008 | |
| WO | 2008153818 A1 | 12/2008 | |
| WO | 2009030405 | 3/2009 | |

OTHER PUBLICATIONS

New Zealand Examination Report dated May 20, 2009 for Patent Application No. 553742.

Almulla et al., Desalination, 153 (2002), pp. 237-243.

Anonymous, "Nonwoven Constructions of Dyneon "THV and Dyneon"THE Fluorothermoplastics", Research Disclosure Journal, Apr. 1999, RD 420013, 2 pages.

Cote et al., Wat. Sci. Tech. 38(4-5) (1998), pp. 437-442.

Cote, et al. "A New Immersed Membrane for Pretreatment to Reverse Osmosis" Desalination 139 (2001) 229-236.

Craig, Jones, "Applications of Hydrogen Peroxide and Derivatives," The Royal Society of Chemistry, Cambridge, UK 1999 Chapters 2 and 5.

Crawford et al., "Procurement of Membrane Equipment: Differences Between Water Treatment and Membrane Bioreactor (MBR) Applications" (2003).

Davis et al., Membrane Technology Conference, "Membrane Bioreactor Evaluation for Water Reuse in Seattle, Washington" (2003).

DeCarolis et al., Membrane Technology Conference, "Optimization of Various MBR Systems for Water Reclamation" (2003).

Delgrange-Vincent, N. et al., Desalination 131 (2000) 353-362.

Dow Chemicals Company, "Filmtec Membranes—Cleaning Procedures for Filmtec FT30 Elements," Tech Facts, Online, Jun. 30, 2000, XP002237568.

Husain, H. et al., "The ZENON experience with membrane bioreactors for municipal wastewater treatment," MBR2: Membr. Bioreact. Wastewater Treat., 2nd Intl. Meeting; School of Water Sciences, Cranfield University, Cranfield, UK, Jun. 1999.

Johnson, "Recent Advances in Microfiltration for Drinking Water Treatment," AWWA Annual Conference, Jun. 20-24, 1999, Chicago, Illinois, entire publication.

Kaiya et al., "Water Purification Using Hollow Fiber Microfiltration Membranes," 6th World Filtration Congress, Nagoya, 1993, pp. 813-816.

Kang et al. "Characteristics of microfiltration membranes in a membrane coupled sequencing batch reactor system" Water Research, Elsevier, Amsterdam, NL, vol. 37, No. 5, Mar. 2003.

Lloyd, D.R. et al. "Microporous Membrane Formation Via Thermally Induced Phase Separation/Solid-Liquid Phase Separation" Journal of Membrane Science (Sep. 15, 1990), pp. 239-261, vol. 52, No. 3, Elsevier Scientific Publishing Company, Amsterdam, NL.

Lozier et al., "Demonstration Testing of ZenoGem and Reverse Osmosis for Indirect Potable Reuse Final Technical Report," published by CH2M Hill, available from the National Technical Information Service, Operations Division, Jan. 2000, entire publication.

Nakayama, "Introduction to Fluid Mechanics," Butterworth-Heinemann, Oxford, UK, 2000.

Ramaswammy S. et al. "Fabrication of Ply (ECTFE) Membranes via thermally induced phase Separation", Journal of Membrane Science, (Dec. 1, 2002), pp. 175-180, vol. 210 No. 1, Scientific Publishing Company, Amsterdam, NL.

Rosenberger et al., Desalination, 151 (2002), pp. 195-200.

U.S. Appl. No. 60/278,007, filed Mar. 23, 2001.

Ueda et al., "Effects of Aeration on Suction Pressure in a Submerged Membrane Bioreactor," Wat. Res. vol. 31, No. 3, 1997, pp. 489-494.

Water Encyclopedia, edited by Jay Lehr, published by John Wiley & Sons, Inc., Hoboken, New Jersey, 2005. Available at http://wwwmrw.interscience.wiley.com/eow/.

White et al., The Chemical Engineering Journal, 52 (1993), pp. 73-77.

Wikipedia, "Seawater," available at http://en.wikipedia.org/wiki/Seawater, Jul. 15, 2007.

Yamamoto et al., Water Science Technology, vol. 2, pp. 43-54; 1989.

Yoon: "Important operational parameters of membrane bioreactor-sludge disintegration (MBR-SD) system for zero excess sludge production" Water Research, Elsevier, Amsterdam, NL, vol. 37, No. 8, Apr. 2003.

Zenon, "Proposal for ZeeWeed® Membrane Filtration Equipment System for the City of Westminster, Colorado, Proposal No. 479-99," Mar. 2000, entire publication.

Japanese Official Action dated Feb. 1, 2011 for Application No. 2007-530550.

Mark et al., "Peroxides and Peroxy Compounds, Inorganic" Kirk—Othmer Encyclopedia of Chemical Technology, Peroxides and Peroxy Compounds, Inorganic, To Piping Systems, New York, Wiley & Sons, Ed., Jan. 1, 1978, pp. 14-18.

Webster's Ninth New Collegiate Dictionary, Merriam-Webster Inc., Publishers, Springfield, Massachusetts, USA, Copyright 1986, p. 1298.

Coulson et al., "Coulson and Richardson's Chemical Engineering," 1999, vol. 1, pp. 358-364.

Australian Examiner's Report dated Nov. 9, 2009 for Application No. 2005284677.

Canadian Office Action dated Oct. 26, 2011 for Application No. 2,579,857.

Chinese First Office Action dated Sep. 15, 2006 for Application No. 200480006910.5 (with translation.

Chinese Second Office Action dated Jan. 25, 2011 for Application No. 200580034570.1 (with translation).

Chinese Third Office Action dated May 30, 2011 for Application No. 200580034570.1 (with translation).

Cui et al., "Airlift crossflow membrane filtration—a feasibility study with dextran ultrafiltration," J. Membrane Sci. (1997) vol. 128, pp. 83-91.

European Search Report dated Jul. 21, 2011 for Application No. 05 779 037.0.

* cited by examiner

METHODS AND APPARATUS FOR REMOVING SOLIDS FROM A MEMBRANE MODULE

CROSS REFERENCE TO RELATED APPLICATIONS

This application is a U.S. national stage application and claims the benefit under 35 U.S.C. §371 of International Application No. PCT/AU2005/001396 filed on Sep. 13, 2005, entitled METHODS AND APPARATUS FOR REMOVING SOLIDS FROM A MEMBRANE MODULE, which is based on Australian Patent Application No. 2004905292 filed on Sep. 14, 2004, entitled METHODS AND APPARATUS FOR REMOVING SOLIDS FROM A MEMBRANE MODULE, each of which is entirely incorporated herein by reference for all purposes, and to which this application claims the benefit of priority.

FIELD OF THE INVENTION

The present invention relates to membrane filtration systems and, more particularly, to a method and apparatus for improving the filtration efficiency of such systems by providing an improved cleaning system for the membranes.

BACKGROUND ART

In a membrane filtration process, the method used to physically clean membranes is of vital importance. An efficient membrane cleaning strategy can maintain a stable permeability of the membrane and reduce the frequency of chemical cleans. A commonly used method to physically clean membranes is a backwash (also called "backflush" or "backpulse") with the permeate/filtrate or a gas. The backwash method is typically used to eject solids blocking the membrane pores and partly dislodge the cake that may have formed on the membrane surface. In a system exposed to a feed containing a high concentration of solids, the fouling occurs more quickly and more severely, in particular, where membranes are densely packed in a module.

Backwash with pressurized gas has proved a very efficient cleaning method and is now widely used in the field of microfiltration processes. The limitation to this method is the membrane pore size. Backwash of membranes with permeate has no limitations to the pore size, but the backwash efficiency is generally lower than gas backwash and the transmembrane pressure (TMP) recovery is not enough to offset the fouling rate. Further means are employed to enhance the backwash efficiency, such as dosing chemicals to the backwash permeate, or in combination with gas scrubbing.

Maruyama et al in Japanese Patent No. JP2031200 discloses a hollow fibre membrane backwashing method. The method involves the following sequence: stop filtration, air-scour membrane, fill the membrane vessel, backwash with permeate under pressurized air and drain the waste. This procedure is repeated to achieve a higher efficiency. Sunaoka et al in a U.S. Pat. No. 5,209,852 describes a process for scrubbing hollow fibre membranes in modules. This process is composed of a two-stage air scrubbing and draining to clean the membranes.

In order to minimise footprint and cost, membrane modules are typically manufactured with a high packing density of membranes, usually in the form of fibres. This increases the amount of membrane area for filtration within a module. However, the higher the packing density the more difficult it is to effectively flush solids captured during the filtration process from the membrane bundle. Therefore, improvement in the efficiency of solids removal during backwash allows either higher solids levels to be processed, or higher membrane packing densities to be used, reducing the cost of treatment.

In prior art fibre membrane systems, removal of solids is usually effected by sweeping with feedwater from one end of the module to the other and then out of the module through a side exit port. In this case, solids are first swept along the fibres to the exit end of the module, but must then cross the fibre bundle to exit the module. In many applications this requirement for the flow to change direction and pass perpendicular to the fibre bundle to exit the module can lead to accumulation of solids near the exit due to the tendency for the fibres to act like a string filter and capture or hinder the exit of solids from the module at this point.

DISCLOSURE OF THE INVENTION

The present invention seeks to overcome or at least ameliorate one or more of the disadvantages of the prior art or at least provide a useful alternative.

According to one aspect, the present invention provides a method of operating a membrane filtration module, said module including one or more membranes extending longitudinally between vertically spaced upper and lower headers into which the ends of the membranes are potted, the membranes having a permeable wall which is subjected to a filtration operation wherein feed containing contaminant matter is applied to one side of the membrane wall and filtrate is withdrawn from the other side of the membrane wall, at least one of said upper and/or lower headers having one or more openings therein, the method including flowing said feed, at least in part, through said one or more openings for application to said membrane wall.

According to another aspect, the present invention provides a method of cleaning a membrane filtration module, said module including one or more membranes located in a feed-containing vessel and extending longitudinally between vertically spaced upper and lower headers into which the ends of the membranes are potted, the membranes having a permeable wall which is subjected to a filtration operation wherein feed containing contaminant matter is applied to one side of the membrane wall and filtrate is withdrawn from the other side of the membrane wall, at least one of said upper and/or lower headers having one or more openings therein, the method including:

a) performing a filtration operation wherein said feed, at least in part, is flowed through said one or more openings for application to said membrane wall;
b) suspending the filtration operation;
c) performing a cleaning process on the membrane wall to dislodge contaminant matter therefrom into liquid surrounding the membrane;
d) performing a sweep of the feed-containing vessel substantially parallel to the longitudinally extending membranes to remove the liquid containing the dislodged contaminant matter, at least in part, through the openings in the header; and
e) recommencing the filtration operation.

For further preference, the openings are provided in the lower header and filtrate is withdrawn from the upper header. Preferably, the openings may also be used to introduce gas into the module to produce bubbles for scouring the surface of the membranes during said cleaning process. The sweep may be performed concurrently with the cleaning process. Preferably, the sweep is a high velocity sweep.

The present invention provides for holes or openings in one of the module pots so that during filtration at least part of the feed liquid will also be drawn in through the openings in the bottom pot and flow into the depths of the membrane bundle, reducing shell side pressure drop and generating some crossflow over the membrane surface. The use of these holes or openings for waste flow also allows solids swept along the membranes during the backwash process to continue to flow parallel to the membranes as they exit the module. The requirement for the solids to cross over the fibre bundle to exit at a side port is substantially reduced or eliminated.

The same concept may be applied to submerged membranes operated in an open tank. In the prior art, solids are typically removed by draining the tank. As the feed containing the solids drains from the module it must change direction near the bottom to flow out of the module and drain from the tank. By providing holes or openings in the bottom of the module, solids can continue to flow substantially parallel to the fibres as they pass out of the module. This uninterrupted flow provides for more efficient removal of solid from the module and tank.

According to a further aspect, the present invention provides a method of operating a membrane filtration module, said module including one or more membranes extending vertically from an upper header into which proximal ends of the membranes are potted, the membranes having a permeable wall which is subjected to a filtration operation wherein feed containing contaminant matter is applied to one side of the membrane wall and filtrate is withdrawn from the other side of the membrane wall, the method including during said filtration operation flowing said feed, at least in part, through one or more openings in the module below said membranes for application to said membrane wall.

According to yet a further aspect, the present provides a method of cleaning a membrane filtration module, said module including one or more membranes located in a feed-containing vessel and extending vertically from an upper header into which proximal ends of the membranes are potted, the membranes having a permeable wall which is subjected to a filtration operation wherein feed containing contaminant matter is applied to one side of the membrane wall and filtrate is withdrawn from the other side of the membrane wall, the method including:

a) performing a filtration operation wherein said feed, at least in part, is flowed through one or more openings in the module below said membranes for application to said membrane wall;
 b) suspending the filtration operation;
 c) performing a cleaning process on the membrane wall to dislodge contaminant matter therefrom into liquid surrounding the membrane;
 d) performing a sweep or drain-down of the feed-containing vessel substantially parallel to the vertically extending membranes to remove the liquid containing the dislodged contaminant matter, at least in part, through said opening or openings in the module beneath said membranes; and
 e) recommencing the filtration operation.

Apparatus for performing the above methods is also included within the scope of the present invention.

BRIEF DESCRIPTION OF THE DRAWING

Embodiments of the invention will now be described, by way of example only, with reference to the accompanying drawings in which.

DESCRIPTION OF PREFERRED EMBODIMENTS

Figure 1:
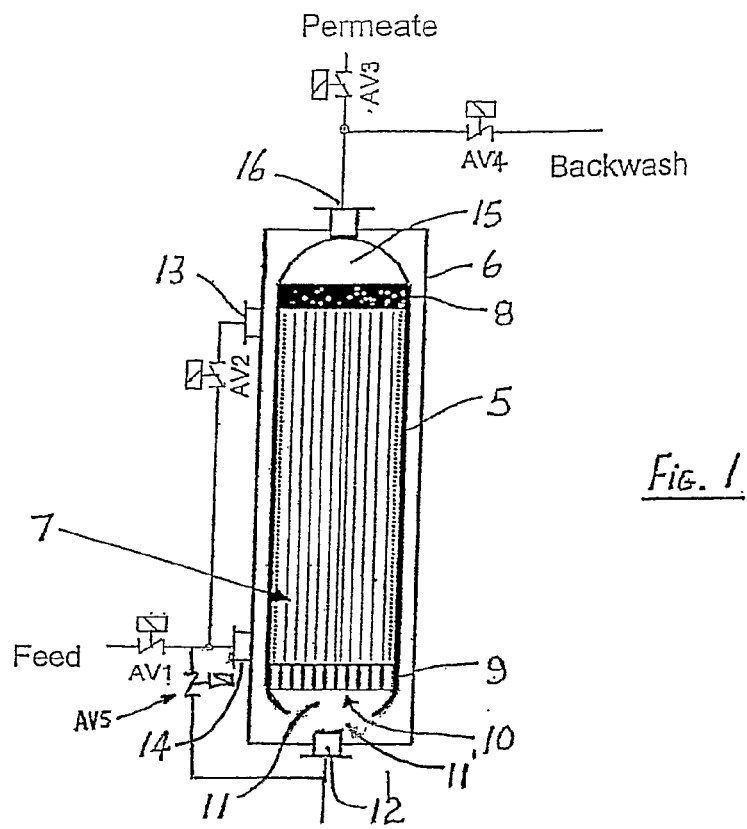
FIG. 1 shows a schematic sectional view of a membrane module according to one embodiment.

Referring to the FIG. 1, the filtration module 5 is mounted within a housing vessel 6 which contains the feed to be filtered. The filtration module 5 contains a bundle or bundles of hollow fibre membranes 7 extending between upper and lower headers 8 and 9, respectively. The lower header 9 is provided with a number of openings 10 communicating with the interior of the fibre bundle and an open-ended plenum chamber 11 having an opening 11'. An inlet/outlet port 12 is provided at the base of the module 5. Feed is supplied through ports 12, 13 and 14 under the control of valves AV5, AV1 and AV2.

Permeate/filtrate is withdrawn through chamber 15 and port 16 under control of valve AV3. A backwash may also be applied through port 16 under the control of valve AV4.

Figure 2:
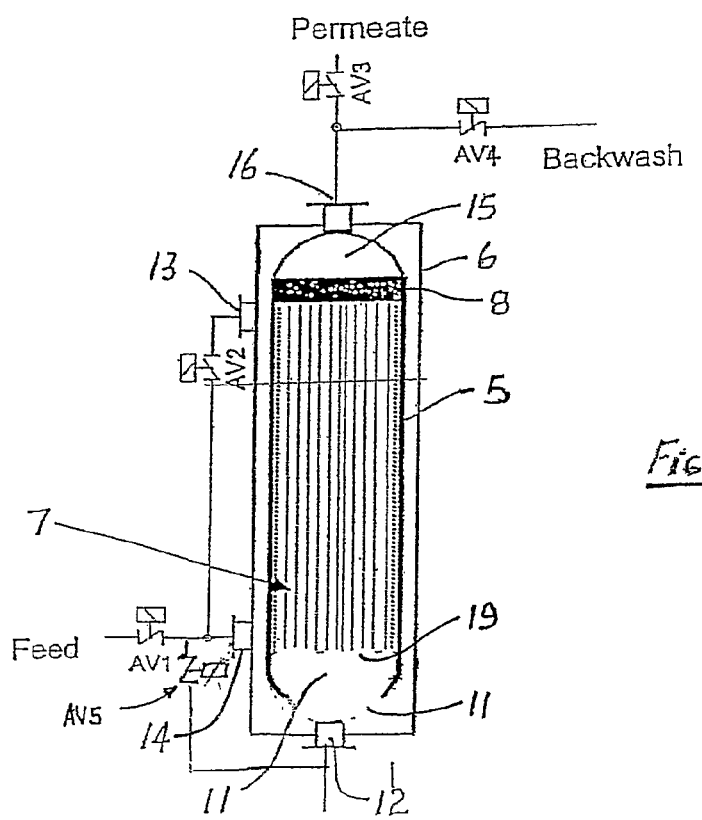
FIG. 2 shows a schematic sectional view of a membrane module according to further embodiment.

FIG. 2 shows a similar arrangement to FIG. 1, however, in this embodiment the hollow fibre membranes 7 are suspended vertically from the upper header 8 and are not potted at their lower distal ends 19. The distal ends 19 of each fibre membrane 7 are closed and filtrate withdrawn through the upper header 8.

In use, solids accumulated within the modules 5 following filtration and backwash are flushed or swept from the modules 5 through the openings 10 by opening port 12 and applying a suitable pressure to the feed within the module 5. The waste is flushed through the opening 11' in the plenum chamber 11 and removed through open port 12.

Figure 3A:
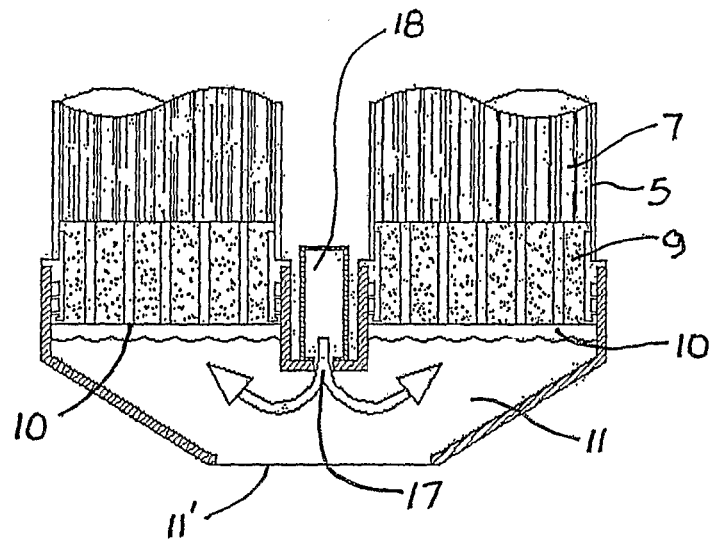
FIGS. 3a and 3b show an enlarged schematic sectional view of the lower header of a non-pressurized filtration system during the aeration and drain-down phases, respectively.
Figure 3B:
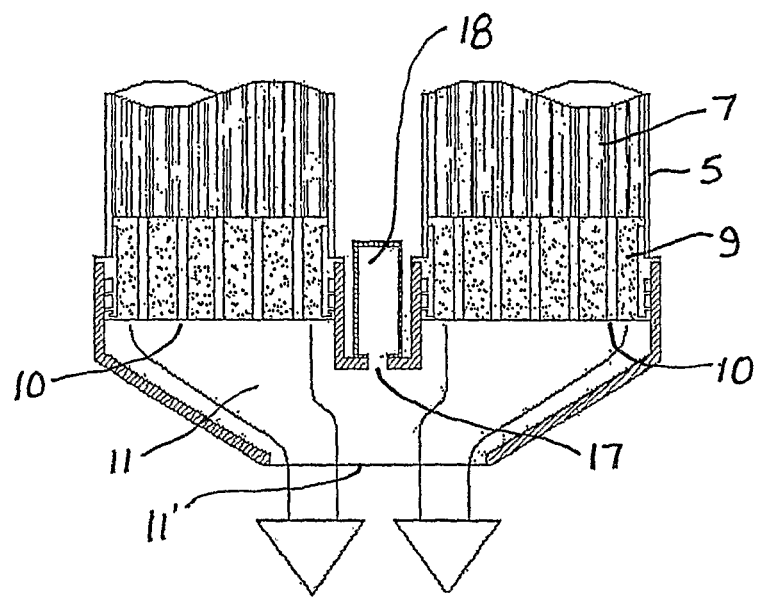

FIGS. 3a and 3b show an enlarged view of the lower headers 9 of a pair of modules 5 connected to a single plenum chamber 11 in a non-pressurized filtration system. The modules 5 in this embodiment are mounted in an open vessel (not shown) and the waste liquid containing solids accumulated within the modules 5 following filtration and backwash is drained through the openings 10 under force of gravity, as shown in FIG. 3b.

As best shown in FIG. 3a, port 17 connected to a gas supply manifold 18 may also be used to supply gas to openings 10 to provide scouring bubbles within the module 5 to assist cleaning of the fibre membrane surfaces.

Systems embodying the invention may provide a number of benefits including:

1. Enhanced solids removal during backwash due to sweeping action along the fibre surface rather than across multiple fibres.

2. Easier contact of feed liquid with the inside of the membrane bundle during filtration (feed liquid can be drawn into the centre of the bundle through the same holes during filtration). This also induces a form of crossflow during filtration.

3. Rack inserts containing sets of membrane modules can be lowered down closer to the bottom of the module as an open area is no longer required beneath the modules to accommodate manifolds and piping used for solids removal and feed inlet, this now takes place through the openings in the pot. The result is better void space reduction efficiency as well as less space for drainage.

4. The plenum chambers can be connected to a pipe or manifold and the backwash waste pumped out of the module rather then gravity flowed, and/or the feedwater pumped in during filtration.

It will be appreciated that further embodiments and exemplifications of the invention are possible with departing from the spirit or scope of the invention described.

The invention claimed is:

1. A method of cleaning a plurality of membrane filtration modules comprising:

performing a filtration operation with the plurality of filtration modules submersed in liquid in a vessel and having lower headers connected to a single open-ended plenum chamber including a as supply manifold disposed between the plurality of filtration modules and configured to direct as downward into the single open-ended plenum chamber between the plurality of filtration modules, each of the plurality of filtration modules including one or more membranes extending longitudinally between vertically spaced upper headers and the lower headers into which the ends of the membranes are potted, the lower headers having one or more openings, the single open-ended plenum chamber having an open lower end spaced from a port in the base of the vessel without any intervening structures therebetween, the membranes having permeable walls which are subjected to a filtration operation wherein the liquid is applied to one side of the membrane walls and filtrate is withdrawn from an other side of the membrane walls, and wherein the liquid is flowed through the one or more openings in the lower headers and the port in the base of the vessel;

suspending the filtration operation;

performing a cleaning process on the membrane walls to dislodge contaminant matter therefrom into liquid surrounding the membranes;

removing the dislodged contaminant matter from the plurality of filtration modules in a direction substantially parallel to the longitudinally extending membranes, the dislodged contaminant matter flowing substantially parallel to the longitudinally extending membranes while exiting the plurality of filtration modules through the openings in the lower headers and proceeding through the open lower end of the single open-ended plenum chamber and the port in the base of the vessel, the dislodged contaminant matter not flowing perpendicular to the membranes and not exiting through side ports of the plurality of filtration modules or vessel during the removal from the plurality of filtration modules such that the membranes do not act as string filters; and recommencing the filtration operation.

2. The method of cleaning the plurality of membrane filtration modules of claim 1, wherein filtrate is withdrawn from the upper headers.

3. The method of cleaning the plurality of membrane filtration modules of claim 2, wherein the one or more openings in the lower headers are used to introduce gas into the plurality of filtration modules and produce bubbles for scouring the surface of the membranes during the cleaning process.

4. The method of cleaning the membrane filtration modules of claim 1, wherein the feed-containing vessel is open to atmosphere.

* * * * *